US008107758B2

(12) United States Patent
Lahman et al.

(10) Patent No.: US 8,107,758 B2
(45) Date of Patent: Jan. 31, 2012

(54) BLOCK BASED IMAGE PROCESSING (75) Inventors: Aaron R. Lahman, Redmond, WA (US);
Anish Mohan, Bellevue, WA (US);
Mariyan D. Fransazov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 947 days.

(21) Appl. No.: 12/104,427

(22) Filed: Apr. 16, 2008

(65) Prior Publication Data

US 2009/0263041 A1 Oct. 22, 2009

(51) Int. Cl.
*G06K 9/40* (2006.01)
*G06K 9/36* (2006.01)
*G06F 15/00* (2006.01)

(52) U.S. Cl. .......................... 382/261; 382/284; 358/1.9

(58) Field of Classification Search .................. 382/260, 382/284; 358/1.9
See application file for complete search history.

(56) References Cited

U.S. PATENT DOCUMENTS

| 4,894,646 | A | * | 1/1990 | Ryman | 345/556 |
| 5,315,699 | A | * | 5/1994 | Imai et al. | 345/502 |
| 5,351,305 | A | * | 9/1994 | Wood et al. | 382/128 |
| 5,675,826 | A | * | 10/1997 | Manze et al. | 345/574 |
| 6,321,266 | B1 | * | 11/2001 | Yokomizo et al. | 709/226 |
| 6,370,279 | B1 | * | 4/2002 | Paik | 382/268 |
| 6,665,435 | B1 | * | 12/2003 | Caldato et al. | 382/166 |
| 7,010,163 | B1 | | 3/2006 | Weiss | |
| 7,082,224 | B2 | | 7/2006 | Ikeda et al. | |
| 7,259,783 | B2 | | 8/2007 | Anderson | |
| 7,295,208 | B2 | | 11/2007 | White et al. | |
| 7,369,236 | B1 | * | 5/2008 | Sali et al. | 356/394 |
| 7,388,979 | B2 | * | 6/2008 | Sakai et al. | 382/149 |
| 7,672,474 | B2 | * | 3/2010 | Nakamura et al. | 382/100 |
| 2006/0290705 | A1 | | 12/2006 | White et al. | |
| 2007/0008337 | A1 | * | 1/2007 | White et al. | 345/629 |
| 2008/0068671 | A1 | * | 3/2008 | Yoshida et al. | 358/450 |

FOREIGN PATENT DOCUMENTS

NL WO2005116925 A2 12/2005

OTHER PUBLICATIONS

Shaffer, et al., "Efficient Adaptive Simplification of Massive Meshes", IEEE Visualization '01, Oct. 2001, pp. 8.
Beetz, et al., "Transparent, Flexible, and Resource-Adaptive Image Processing for Autonomous Service Robots", Proceedings of the 13th European Conference on Artificial Intelligence, ECAI, 98., John Wiley & Sons, Ltd., 1998, pp. 5.
Clyne, "The Multiresolution Toolkit: Progressive Access for Regular Gridded Data", Proceedings of Visualization, Images, and Image Processing, 2003, pp. 6.

* cited by examiner

*Primary Examiner* — Brian Werner
*Assistant Examiner* — Utpal Shah (57) ABSTRACT

Block based image processing techniques are described in which one or more processing filters are applied to an image block by block. One or more filters are identified to process an image. Attributes are obtained that describe the one or more filters. Image data is loaded into multiple input blocks based upon the obtained attributes. The one or more filters are applied to the image block by block. The results of the processing may be stored as multiple processed blocks corresponding to the multiple input blocks. Then, the processed blocks are stitched together to form a processed image.

19 Claims, 5 Drawing Sheets

BLOCK BASED IMAGE PROCESSING

BACKGROUND

Image processing may involve application of different processing filters to an image to obtain a resultant image. To verify that the processing filters and related software (e.g., drivers) operate properly, the resultant image output via processing by the filters may be compared to a reference image.

One traditional technique used to verify a resultant image against a reference image involves output of the images to a display device or physical media. Then, a visual comparison of the output images is made, e.g., manually by a developer or other human. When differences are determined through this comparison, the developer may make software changes that cause the resultant image output via processing by the filters to more closely match the reference image. Typically, processing of images using traditional techniques may also involve filters that operate on data for an entire image, such as a Gaussian blur filter or other convolution filter.

Since the traditional verification techniques are manual, these techniques may be labor intensive and provide subjective results. Further, when processing large images the entire image may not fit in memory (e.g., RAM), which makes it difficult to efficiently use memory space and apply filters that operate on data for an entire image. Accordingly, traditional verification techniques may be inefficient, time-consuming, and subject to human error.

SUMMARY

Block based image processing techniques are described in which one or more processing filters are applied to an image, block by block. One or more filters are identified to process an image. Attributes are obtained that describe the one or more filters. Image data is loaded into multiple input blocks based upon the obtained attributes. The one or more filters are applied to the image block by block. The results of the processing may be stored as multiple processed blocks corresponding to the multiple input blocks. Then, the processed blocks are stitched together to form a processed image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

As the quality of images available to users has increased, the size of images processed by computing devices has correspondingly increased. Therefore, it may be difficult to process an image as a whole, particularly with a very large image. For example, available memory of a computing device may not be sufficient to hold an entire image, such as a very large print job, digital photographs, high definition video frame, and so forth. Thus, traditional techniques to process images may not be suited to processing larger images, which have become more prevalent.

Block based image processing techniques are described in which processing is performed on a block by block basis. In an implementation, an image analysis tool may identify one or more filters to be applied to an image. A database may be maintained that stores the filters and attributes corresponding to the filters. The image analysis tool may reference the database to identify filters and obtain corresponding attributes. For instance, the attributes may describe buffer space used for a particular filter, a size for output from the filter, invalid data created by the filter, and so forth.

The image analysis tool may then divide the image into a plurality of blocks based upon the attributes. The one or more filters are applied individually to each block, e.g., on a block by block basis to form processed blocks. The results of the block by block processing may be stored as multiple processed blocks corresponding to the plurality of input blocks. The image analysis tool then stitches together the processed blocks to form a processed image. In this manner, the image analysis tool may apply standard processing filters to efficiently process images, including very large images that may not fit in available memory of a computing device.

In the following discussion, an example environment is first described that is operable to perform block based image processing techniques. Example procedures are then described that may be employed in the example environment, as well as in other environments. Although these techniques are described as employed within an example computing environment in the following discussion, it should be readily apparent that these techniques may be incorporated within a variety of environments without departing from the spirit and scope thereof.

Example Environment

Figure 1:
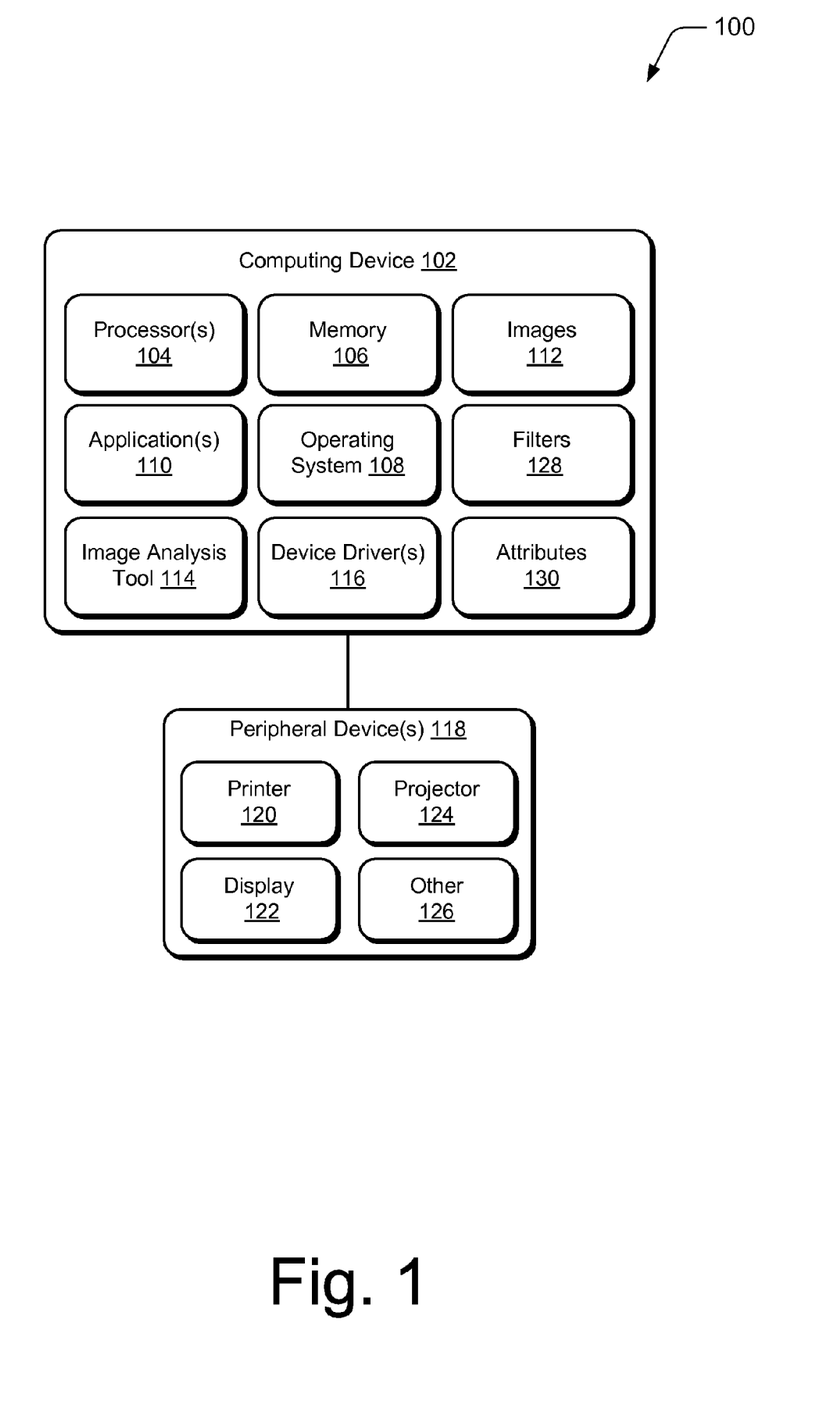
FIG. 1 depicts an example environment in which block based image processing techniques may be employed.

FIG. 1 is an illustration of an environment 100 in an example implementation that is operable to employ block based image processing techniques described herein. The illustrated environment 100 includes a computing device 102 having one or more processors 104 and a memory 106. Computing device 102 may be configured in a variety of ways. For example, computing device 102 may be configured as a computer that is capable of communicating over a network, such as a desktop computer, a mobile station, an entertainment appliance, a set-top box communicatively coupled to a display device, a wireless phone, a game console, and so forth.

In the following description a referenced component, such as computing device 102, may refer to one or more entities. Therefore, by convention, reference may be made to a single entity (e.g., the computing device 102) or multiple entities (e.g., the computing devices 102, the plurality of computing devices 102, and so on) using the same reference number.

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The one or more processors 104 may perform single threaded and multi-threaded operations. Additionally, although a single memory 106 is shown for the computing device 102, a wide variety of types and combinations of memory may be employed, such as random access memory (RAM), hard disk memory, video memory, removable medium memory, and other types of computer-readable media.

The computing device 102 is further illustrated as including an operating system 108 and a variety of applications 110. The one or more processors 104 may retrieve and execute computer-program instructions from applications 110 to provide a wide range of functionality to the computing device 102, including but not limited to office productivity, email, media management, printing, networking, web-browsing, and so forth. A variety of program data related to the applications 110 is contemplated examples of which include office documents, multimedia files, emails, data files, web pages, user profile and/or preference data, and so forth.

The program data of a computing device 102 may also include various images 112 upon which various image processing may be performed to display, print, output, or otherwise manipulate the images 112. The illustrated images 112 are representative of a variety of different types of images including but not limited to: captured video images, digital photographs, scanned images, print jobs, and so forth.

Computing device 102 is further illustrated as including an image analysis tool 114 which is representative of functionality of the computing device 102 to perform various processing and other manipulation of images 112. While depicted as a stand-alone module in FIG. 1, the image analysis tool 114 may also be implemented as a sub-module of another application 110. Image analysis tool 114 may further include functionality of the computing device 102 that is operable to perform block based image processing techniques described herein. In particular, the image analysis tool 114 may operate to define or set a tunable block size, determine various filters to apply to an image, receive attributes of the filters, use the attributes to load image data into multiple blocks of the defined size, process the block with the filters, and form a processed image from processed blocks.

The operating system 108 of the computing device 102 may support a variety of device drivers 116 to operate corresponding peripheral devices 118. For instance, one or more device drivers 116 illustrated in FIG. 1 may be executed on the processor 104 to facilitate operation of corresponding peripheral devices 118. Examples of peripheral devices 118 as shown in FIG. 1 include a printer 120, a display device 122 such as an LCD monitor, and a projector 124. A variety of other 126 peripheral devices are also contemplated including but not limited to: a game device, a memory card reader, a digital camera, video camera, portable multimedia device, an optical disk drive, and so forth.

Generally, the device drivers 116 represent modules (e.g., which may or may not be provided by a third party) that provide interfaces between the applications 110, the operating system 108, and corresponding peripheral devices 118. In an implementation, the image analysis tool 114 includes functionality to verify operation of various device drivers 116. For instance, the image analysis tool 114 may perform block based image processing techniques to compare different versions of a device driver 116. More particularly, the image analysis tool 114 may perform processing related to verifying that image processing by a device driver 116 is correctly performed. For example, image analysis tool 114 may perform image processing to compare an image 112 that is output by one version of a device driver 116 against another version of the image 112 that is output by a previous version of the device driver 116, or against a reference image that is considered to be correct. Further discussion of using image analysis tool 114 to compare two images may be found in relation to FIG. 5.

Image processing performed via the image analysis tool 114 and/or a device driver 116 may include applying a variety of filters 128. The filters 128 are representative of various functions, algorithms, and other code blocks to perform various processing steps on images 112. Device drivers 116 may use various filters 128 to perform image processing tasks. FIG. 1 depicts filters 128 as having associated attributes 130. The attributes 130 may describe various aspects of corresponding filters 128, such as buffer space used by the filter, arrangement of valid and invalid data in output from the filter, a block overlap parameter for the filter that describe how to overlap input blocks, and so forth.

In operation, image analysis tool 114 may reference the attributes 130 of various filters 128 to determine how to efficiently process a particular image 112 using one or more corresponding filters 128. Specifically, the attributes 130 may be used by the image analysis tool 114 to determine how to break up an image 112 into manageable blocks (e.g., chunks). A tunable memory parameter may be defined to determine the size of the blocks. The attributes 130 may then be used to determine how to efficiently fill the blocks of the defined size and how to stitch the blocks back together once they are processed.

For example, a Gaussian blur filter may be associated with attributes 130 that define an amount of output data that will be invalid based upon how the filter works. These attributes 130 for the Gaussian blur filter accordingly may be used to determine what data to put into the input blocks, what buffer/overlap to use, and what data to discard in the output (e.g., invalid data). Then, the blocks may be stitched back together to form a processed image that represents the valid data obtained through the processing. Further discussion of using image analysis tool 114 to perform block by block image processing techniques may be found in relation of the following figures.

Generally, the functions described herein can be implemented using software, firmware, hardware (e.g., fixed-logic circuitry), manual processing, or a combination of these implementations. The terms "module", "functionality", "engine" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices. The features of the techniques to provide block based image processing are platform independent, meaning that the techniques may be implemented on a variety of commercial computing platforms having a variety of processors.

Figure 2:
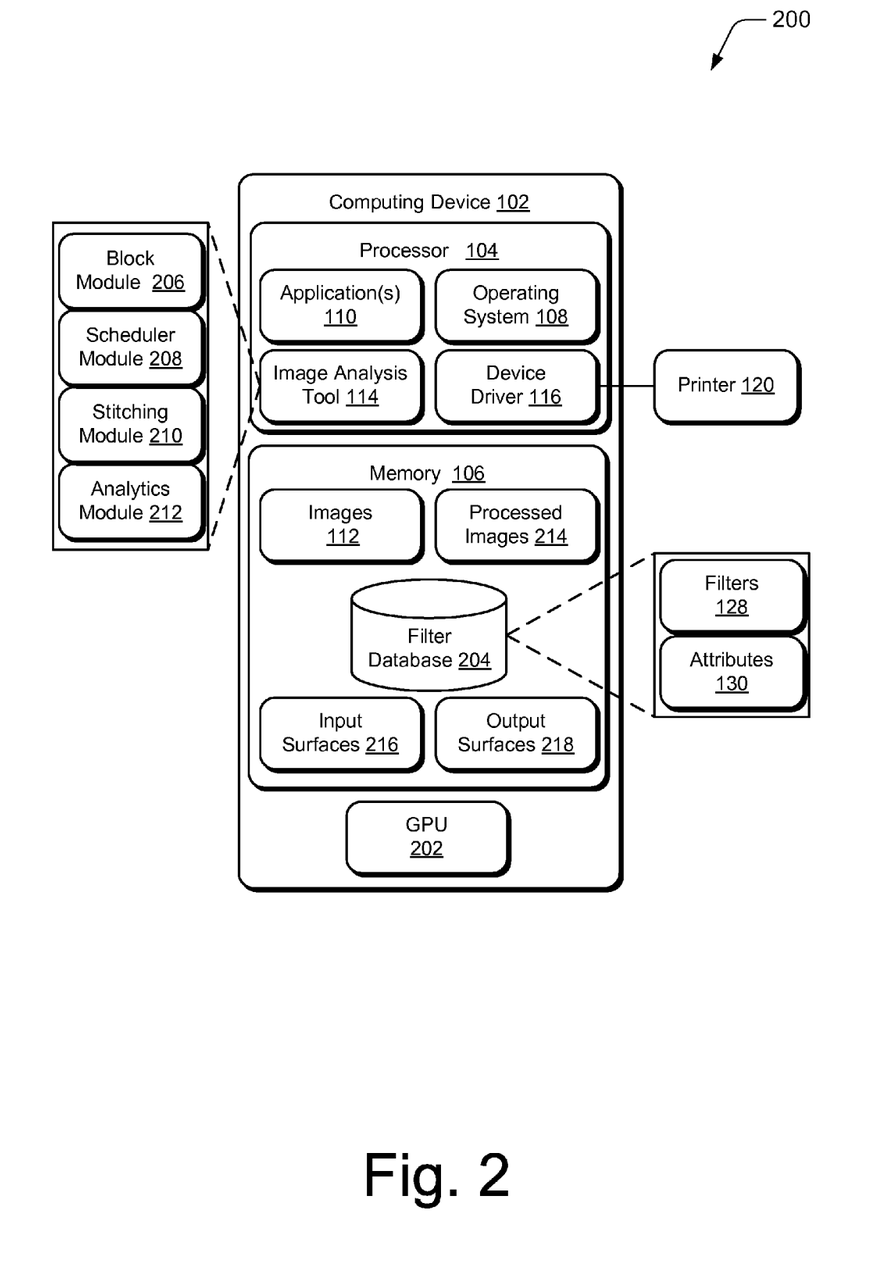
FIG. 2 depicts an example computing device of FIG. 1 to perform block based image processing techniques showing aspects in greater detail.

FIG. 2 depicts an example implementation 200 of a computing device 102 of FIG. 1 to perform block based image processing techniques showing aspects of the computing device 102 in greater detail. The computing device 102 is depicted as including a processor 104 and memory 106 as described in relation to FIG. 1. The processor 104 is illustrated as executing the operating system 108, applications 110, the image analysis tool 114, and a device driver 116, each of which is also storable in the memory 106. The device driver 116 in the illustrated example is configured as a printer driver that operates a corresponding printer 120. Naturally, as discussed in relation to FIG. 1, a variety of other peripheral devices 118 and corresponding device drivers 116 are also contemplated.

While a single processor 104 is depicted, the illustrated processor 104 may be representative of multiple processors operable to perform various tasks associated with block based image processing techniques. In the illustrated example, computing device 102 also includes a dedicated graphics processing unit (GPU) 202 configured to perform various graphics rendering tasks. Functionality provided by the GPU 202 may include controlling aspects of resolution, pixel shading operations, color depth, print rendering, texture mapping, and other tasks associated with processing of images such as forming blocks, loading image data into blocks, bitmap transfers and painting, window resizing and repositioning, line drawing, font scaling polygon drawing, and so on.

The GPU 202 may be capable of handling these processing tasks in hardware at greater speeds than software executed on the one or more processors 104. Thus, the dedicated processing capability of the GPU 202 may reduce the workload of the processors 104 and free up system resources for other tasks. The GPU 202 may be operated under the influence of the operating system 108 and/or an application 110 to manage graphic processing, such as the image analysis tool 114. Thus, a variety of processing functionality (e.g., the one or more processors 104 and the GPU 202) may be employed in various combinations to perform block based image processing techniques described herein.

Memory 106 is depicted as storing a plurality of images 112 that may be processed via the image analysis tool 114. Memory 106 also includes a filter database 204. The filter database 204 maintains a library of the filters 128 that may be applied via the image analysis tool 114. Filter database 204 may also store attributes 130 associated with the various filters 128. As noted, attributes 130 described aspects of corresponding filters 128. The attributes 130 may be provided to the image analysis tool 114, which uses the attributes 130 to determine how to fill blocks with image data and how to stitch processed blocks back together efficiently.

The image analysis tool 114 may be arranged to include a variety of sub-modules to perform block based image processing techniques described herein on images 112. In the depicted example, the image analysis tool 114 includes a block module 206, a scheduler module 208, a stitching module 210, and an analytics module 212. The block module 206 is representative of functionality to define or set a tunable block size, and to load image data into blocks for processing based upon attributes 130 of filters 128. When image data has been loaded into the blocks, scheduler module 208 may operate to schedule the blocks for processing via one or more processors 104 and/or other processing components (e.g., GPU 202).

The stitching module 210 is representative of functionality operable to form processed images 214 (depicted as stored in memory 106) from the processed blocks based upon the attributes 130. Analytics module 212 is representative of functionality operable to perform image comparisons, statistical analysis, and evaluation based upon the block based image processing. For instance, the analytics module 212 may compare a version of an image 112 produced for output to the printer 120 by the device driver 116 with a prior version of the image 112 that is produced with an earlier version of the device driver 116. Further discussion of operation of image analysis tool 114 to perform block based image processing may be found in relation the following procedures.

Memory 106 may also includes various memory surfaces which may be arranged for processing of various images 112 to produce corresponding processed images 214. For instance, the image analysis tool 114 may arrange various input surfaces 216 to hold/sequence input data for processing tasks performed on images 112. The image analysis tool 114 may also arrange output surfaces 218, to store the results of processing the input data held in input surfaces 216 for additional processing, formation of a processed image 214, and so forth. The input surfaces 216 and output surfaces 218 of memory 106 may also be representative of various blocks formed in memory 106 used in the processing of images 112, further discussion of which may be found in relation the following procedures.

Example Procedures

The following discussion describes techniques related to block based image processing that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the example environment 100 of FIG. 1 and the example implementation 200 of a computing device 102 of FIG. 2.

Figure 3:
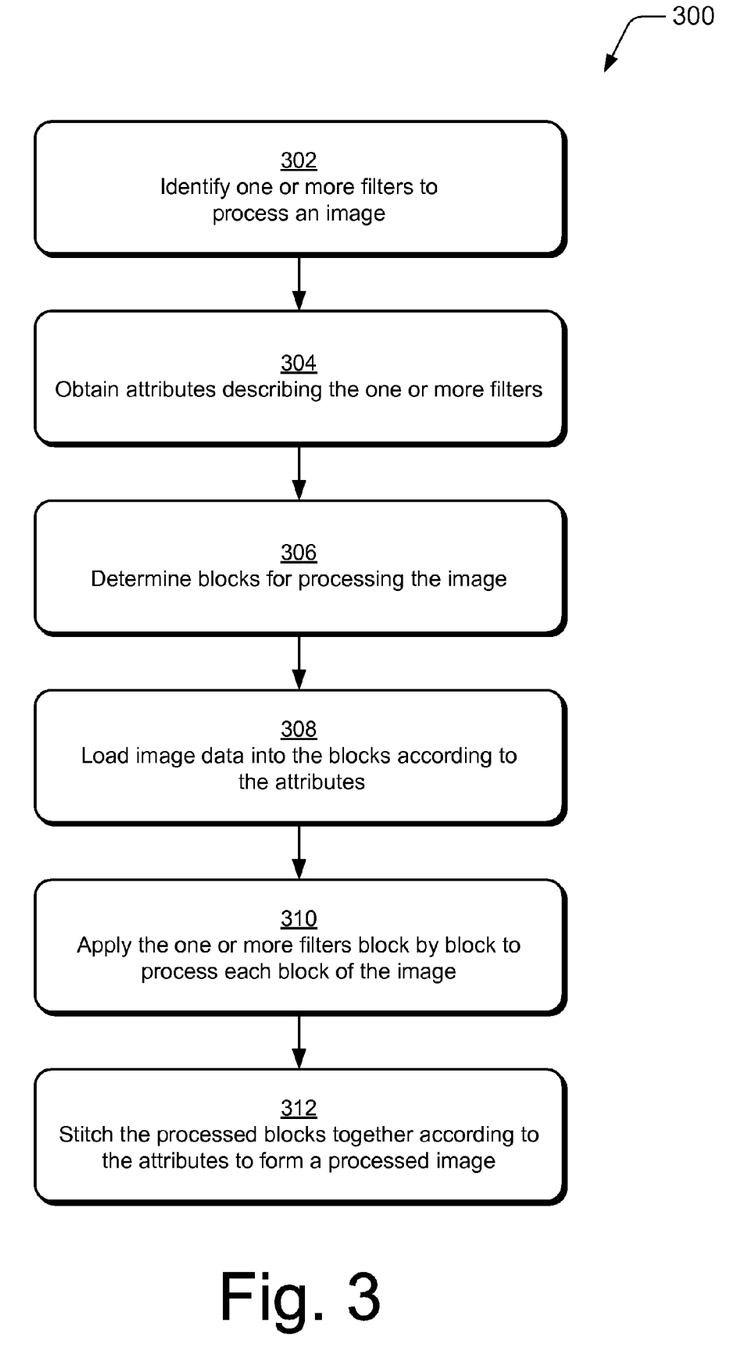
FIG. 3 depicts an example procedure in which filter attributes are used to perform block based image processing techniques.

FIG. 3 depicts a procedure 300 in an example implementation in which filter attributes are used to perform block based image processing techniques. In discussion of procedure 300, reference may be made to FIG. 4 which depicts an example diagram 400 illustrating aspects of dividing an image 112 into block and scan line portions in accordance with block based image processing techniques described herein.

One or more filters are identified to process an image (block 302). For instance, the image analysis tool 114 may be configured to apply various filters 128 to process an image 112. For the purposes of this example, assume that a print job image related to a word processing document of an application 110 is to be analyzed. The print job image may be generated from a word processing document by a device driver 116 (e.g., printer driver) for output to a corresponding printer 120. Image analysis tool 114 may be employed to process the print job image to verify proper operation of the device driver 116. In particular, a user may specify various filters 128 to perform various processing to verify operation of the device driver 116. This may include a variety of filters to qualitatively analyze the image, such as assessing how the image looks, how the colors are reproduced, the alignment of text and graphics, and so forth.

For example, a user interface may be exposed by the image analysis tool 114 that provides functionality operable by a user may to specify various filters 128. For instance, the user interface may include various selectable controls (e.g., checkboxes, drop-down lists, input fields, and so forth) to enable selection of various filters 128 that are available in a filter database 204 as depicted in FIG. 2. The image analysis tool 114 may operate to identify which of the available filters 128 are selected, retrieve the filters 128 from the filter database 204, and apply the filters 128 to perform processing of the print job image.

Attributes are obtained that describe the one or more filters (block 304). As previously described, filters 128 maintained in a filter database 204 may be associated with attributes 130.

In the preceding example, when the image analysis tool 114 identifies filters 128 to apply the print job image, the image analysis tool 114 may be further configured to obtain various attributes 130 corresponding to the identified filters 128. For instance, the attributes 130 corresponding to the identified filters 128 may be obtained by the image analysis tool 114 from the filter database 204.

Blocks are determined for processing the image (block 306). Then, image data is loaded into the blocks according to the attributes (block 308). In the continuing example, the image analysis tool 114 may obtain the print job image and divide the print job image into a plurality of blocks for processing. As previously noted, a tunable memory parameter may be set that defines a block size for image processing. For instance, a user may input a value for the tunable memory parameter to the image analysis tool 114. The image analysis tool 114 uses the defined memory size to create blocks for processing the image 112. In particular, the block module 206 may operate to obtain the tunable memory parameter, set up blocks of the defined size in memory 106, determine how to divide up an image 112, and load the image data into the blocks. The block module 206 may arrange input surfaces 216 of memory 106 as blocks of the defined memory size.

When a filter 128 is applied to an image 112, the filter 128 may operate many times on each pixel. When handling very large images, efficiency may be gained by tightly arranging image data in memory 106 and processing the smaller chunks of data. In other words, processing the image 112 as blocks may be faster and more efficient than processing full scan lines, or applying filters to an entire image 112. Memory caches traditionally are designed to fetch contiguous sections of memory at a time (for example, a cache line or virtual memory page). Accordingly, accessing even one small portion (e.g., a memory word) may retrieve a whole section. Additionally, there may be a fixed number of memory sections in the cache related to the size of the cache. Thus, when the memory sections are full (e.g., the cache is full), one of the sections may be evicted to make space for new data. When a section is evicted, the evicted section may be saved to a slower, larger memory pool for further access. Accessing data from the larger memory pool may be relatively less efficient than accessing the smaller memory sections in the cache (e.g., accessing the larger memory pool takes substantially more time). When image processing is performed on full scan lines, the memory distance between vertically adjacent pixels is very large and more memory sections may be used for processing corresponding blocks.

By tightly arranging image data in memory 106 and processing the smaller chunks of data the number of memory sections used to process blocks is reduced. For example, by shortening the scan lines, the same amount of memory may be used to process a block, but fewer memory sections are used. By reducing the number of sections used for storing each memory block, a greater number of sections are available for use by image processing algorithms and the rate at which sections are evicted is reduced. Accordingly, the processing of an image 112 becomes correspondingly more efficient and/or faster.

Thus, the tunable memory parameter may be defined according to the size of images 112 to process and the filters 128 used in the processing. In an implementation, the tunable memory parameter defines a memory size that is relatively small compared size of the image 112. The tunable memory parameter may be set to define a block dimension (e.g. height and width) in the range of approximately 10 to 100 times smaller than the length of a scan line. For example, if the print job in the continuing example is a 600 DPI image, a scan line of the image may be approximately 5100 pixels long. In this example, a memory size for blocks of approximately 64 by 64 pixels to 256 by 256 pixels may be defined to obtain suitable gains efficiency, e.g., increased processing speed.

The block module 206 may then obtain and use the filter attributes 130 to determine how to efficiently load image data from an image 112 into the blocks of the defined size. In particular, the block module 206 may use the attributes 130 to compute buffers for a filter 128, to determine the output size from the filter, to compute overlaps of image data in the blocks, to understand valid and invalid data produced by a filter, and so forth.

Figure 4:
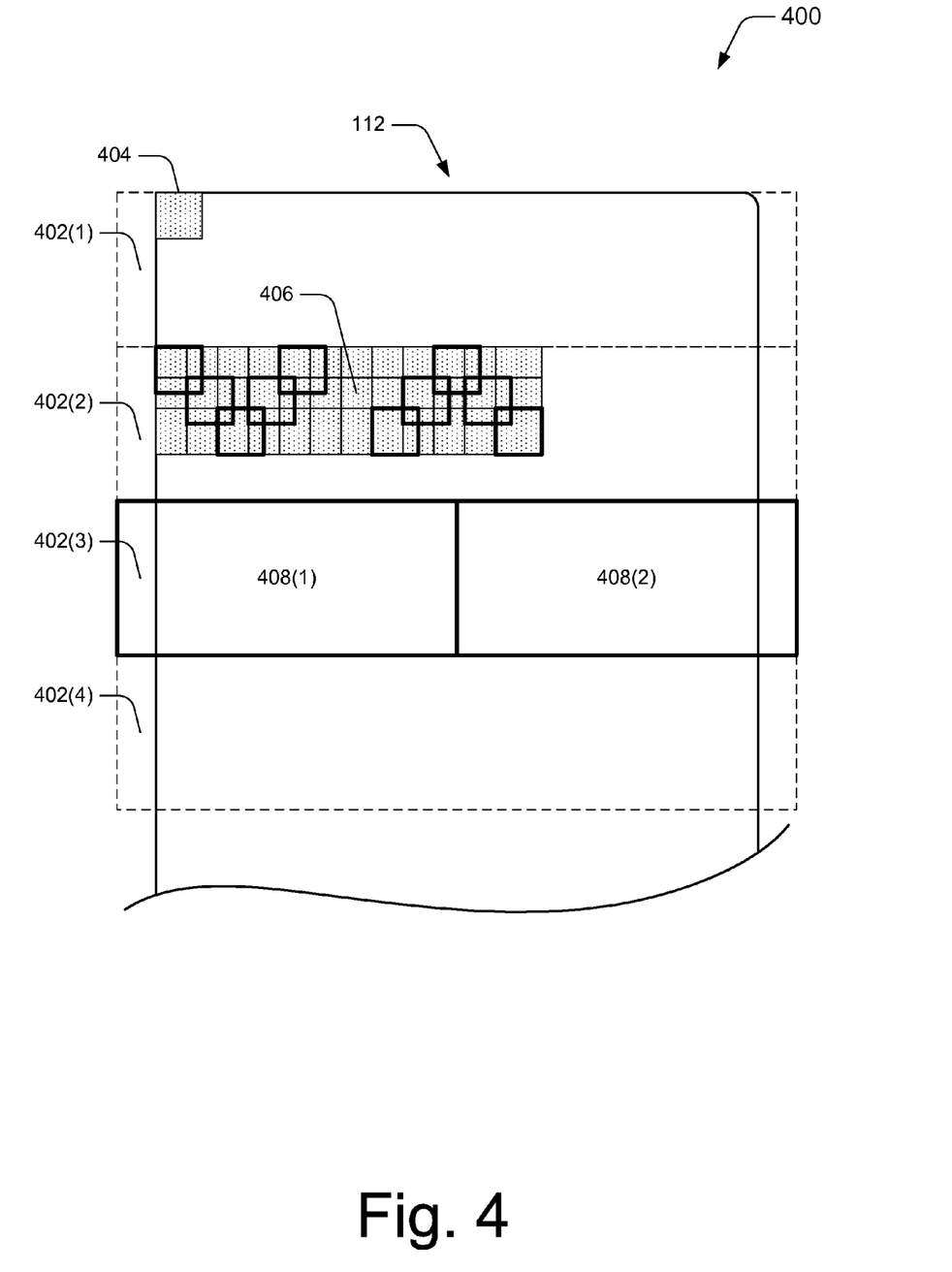
FIG. 4 depicts a diagram representing an example image that is illustrated as being divided into various blocks and scan line portions to perform block based image processing techniques.

Referring now to FIG. 4, an image 112 is illustrated as being processed as successive scan lines 402(1)-402(4). To process the image 112, the image analysis tool 114 may read the image into memory 106 as a series of scan lines 402(1)-402(4). Typically, the size of scan lines 402(1)-402(4) is determined based upon computing device 102 parameters such as the processing power, amount of RAM, cache size and so forth. However, the available memory or cache may not be sufficient to efficiently process a scan line of an image 112, particularly as the size of the image 112 becomes larger and larger. In accordance with block based image processing technique described herein, images 112 may be broken down into various blocks and processed block by block.

For instance, scan line 402(1) in FIG. 2 is depicted as having a representative block 404. The block 404 may be sized by the block module 206 according to the tunable memory parameter as previously discussed. Block module 206 may load the scan line 402(1) into memory 106 and then form the scan line 402(1) into a plurality of blocks 404 for processing. The block 404 is representative of a plurality of blocks 404 that may be formed in memory 106. More particularly, the blocks 404 may be formed as input surfaces 216 in the memory 106. When processing of scan line 402(1) is complete, the data may be discarded from memory 106 to make space for other data.

The region 406 associated with scan line 402(2) is representative of overlapping of blocks 404 used in performing block based image processing techniques. As illustrated by the dark outlining in region 406, image data loaded into blocks 404 may overlap horizontally and/or vertically. It is noted that blocks 404 may also overlap across scan lines, such as between scan lines 402(1) and 402(2). As noted, the overlap for blocks 404 of image 112 may be computed by the block module 206 based upon the filters 128 used to process the image 112 and the corresponding attributes 130. The attributes 130 describe corresponding filters 128 such that the block module 206 understands how the filters 128 operate on an image 112 and may determine how to arrange image data in the blocks 404.

In an implementation, the scan lines 402(1)-402(4) may also be divided into smaller portions. For instance, scan line 402(3) is illustrated in FIG. 4 as being divided into scan line portions 408(1) and 408(2). Consider a situation in which available memory 106 of a computing device 102 (e.g., RAM) is too small to fit scan lines 402(1)-402(4) of the image 112. For example, a computing device 102 may have 2 gigabytes of RAM. For a particularly large image, scan line 402(3) may be 4 gigabytes (or more) and accordingly, block module 206 may be unable to read the entire scan line 402(3) into RAM.

In this case, block module 206 may be configured to operate on scan line portions 408(1) and 408(2) in a manner similar to operating on successive scan lines, e.g., scan lines 402(1)-402(4). Scan line portion 408(1) may be loaded, divided into blocks, processed and the resultant data stored in memory 106. Then, scan line portion 408(2) may operated on separately and the resultant data stored in memory 106. Image analysis tool 114 may then stitch the resultant data (e.g. processed blocks) from scan line portions 408(1) and 408(2) back together. While scan line 402(3) is illustrated as being divided into two scan line portions 408(1) and 408(2), it is contemplated that a scan line may be divided into two or more portions depending on the size of the image 112 to process and the available memory.

Thus, the image analysis tool 114 may process an image piecemeal and block by block. The image analysis tool 114 may operate on an image 112 without loading the entire image 112, or even entire scan lines, into memory 106. This permits efficient processing of even very large images that may be too large in size to fit into available memory 106 of a computing device 102.

Referring again to FIG. 3, the one or more filters are applied block by block to process the image (block 310). For example, the print job image previously described may be formed by the block module 206 into a plurality of blocks within input surfaces 216 for processing by the image analysis tool 114. Once the block module 206 has loaded image data for the print job into input surfaces 216, the image analysis tool 114 may apply one or more identified filters 128 to process the print job image. In particular, the scheduler module 208, depicted as a component of the image analysis tool 114 in FIG. 2 may be configured to apply one or more filters 128 to analyze/test the device driver 116 that is used to form the print job image.

The blocks of image data stored in input surfaces 216 are processed using the one or more identified filters 128. The scheduler module 208 may cause the one or more filters 128 to be applied to each input block. The resultant data is stored, for example, as processed blocks within output surfaces 218. Scheduler module 208 may operate on each of the loaded blocks of data that is produced via the block module 206. The scheduler module 208 may operate upon loaded input blocks as the block module 206 is creating and loading additional blocks. Further, the scheduler module 208 may direct one or more processors 104 to perform the processing. Scheduler module 208 may also direct a graphics processing unit 202 to perform processing in addition to or in lieu of the one or more processors 104.

As noted, using a dedicated graphics processing unit 202 may free up resources of the processors 104 to perform other tasks. A variety of combinations of processing functionality to perform block based processing techniques are contemplated. Accordingly, an image 112, such as the print job image of the continuing example, may be processed as multiple input blocks and the results of the processing are stored as corresponding processed blocks. This allows concurrent processing of many different blocks by various processing functionality of a computing device 102.

The processed blocks are stitched together according to the attributes to form a processed image (block 312). For instance, stitching module 210 may operate to obtain data resulting from processing the input blocks that is stored as processed blocks in output surfaces 218. Stitching module 210 may operate concurrently upon processed blocks as scheduler module 208 is managing processing of additional blocks and as block module 206 is creating and loading additional blocks. Further, the stitching module 210 uses attributes 130 to identify areas or pixels which are invalid, buffer space, and so forth. Thus, the stitching module 210 may use the attributes 130 of the filters 128 to determine which data in the processed blocks is valid and which data is invalid. The invalid data may be discarded. Stitching module 210 then arranges the processed blocks together to generate a processed image 214.

The use of attributes 130 to divide an image 112 into blocks and to stitch processed blocks back together to form a processed image 214 allows the described block based processing techniques to be used with a variety of filters 128 that already exist. Further, the block based processing techniques may be used without modifications to the existing filters. The image analysis tool 114 operates to apply a filter 128 to small portions of an image 112 (e.g., blocks) as though the portions were actually separate images 112 rather than pieces of a larger image. The filter 128 that is applied by the image analysis tool 114 to the small portions of the image 112 operates the same as if the filter 128 were being applied to the image 112 as a whole. However, the use of a tunable memory parameter to set a block size and attributes 130 to manage arrangement of image data as blocks on the input and output sides of a processing sequence may provide faster processing and enable application of filters 128 to images 112 that may be greater in size than a computing device 102 could otherwise handle.

Figure 5:
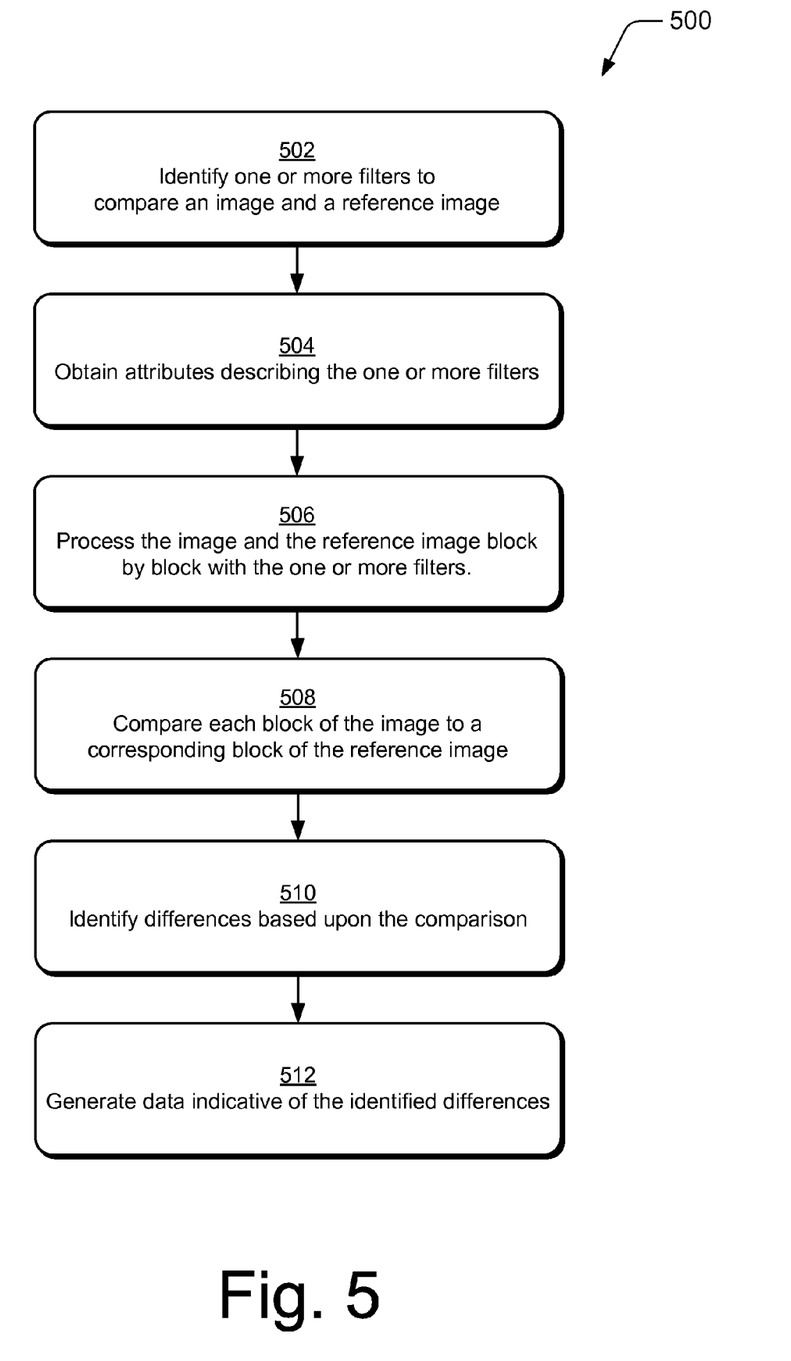
FIG. 5 depicts an example procedure in which block based image processing techniques are used to compare an image to a reference image.

FIG. 5 depicts a procedure 500 in an example implementation in which block based image processing techniques are employed to compare an image to a reference image. One or more filters are identified to compare an image to a reference image (block 502). For the purpose for example, assume that a screen image is generated using a device driver 116 that corresponds to the display device 122 of FIG. 1. A previous version of the device driver 116 may have been used to generate another image which is considered to be correct. In other words, a reference image. Image analysis tool 114 may operate to compare the screen image to the reference image. More particularly, a developer may specify a variety of filters 128 to be applied to the screen image and the reference image to compare the images. Based upon input from the developer, the image analysis tool 114 may identify one or more filters that may be available in the filter database 204.

Attributes are obtained describing the one or more filters (block 504). For instance, the image analysis tool 114 may obtain attributes 130 from filter database 204 that correspond to the one or more filters 128 selected to process the screen image and the reference image.

The image and the reference image are processed block by block with the one or more filters (block 506). In this example, the same set of filters 128 may be applied to both the screen image and the reference image. The tunable memory parameter may also be the same for processing of both the screen image in the reference image. The screen image and the reference image may both be processed in a manner described with respect to the preceding figures.

For instance, block based processing of the screen image and the reference image may occur in accordance with procedure 300 described with respect to FIG. 3. In particular, block module 206 may determine and load blocks of image data as input surfaces 216. A scheduler module 208 may operate to schedule processing of the loaded blocks via one or more processors 104 and/or a graphics processing unit 202. Scheduler module 208 applies the one or more filters 128 to each block of the screen image and each block of the reference image. The data resulting from the processing may be stored as processed blocks in output surfaces 218. The stitching module 210 may operate to produce a processed image 214 from the processed blocks.

Each block of the image is compared to a corresponding block of the reference image (block 508). For example, analytics module 212 illustrated as a component of the image analysis tool 114 in FIG. 2 may be configured to perform image comparisons, statistical analysis, and evaluation based upon the block based processing. For instance, the analytics module 212 may compare the screen image produced by the device driver 116 with the reference image. The reference image may represent an image that is produced with an earlier version of the device driver 116.

The analytics module 212 may compare the two images block by block. Thus, a block of the screen image is compared to a corresponding block of the reference image. The comparison is repeated for each block. The comparisons of processed blocks by the analytics module 212 may occur concurrently as scheduler module 208 is managing processing of additional blocks and as block module 206 is creating and loading additional blocks. Thus, analytics module 212 may compare blocks as they are being produced. Alternatively, comparison by analytics module may occur when loading of the screen image and reference images to blocks in the input surfaces 216 is completed. Likewise, analytics module 212 may operate concurrently with forming the processed blocks into a processed image 214 by the stitching module 210. Alternatively, comparison by analytics module 212 may be completed before forming the processed blocks into processed images 214.

Differences are identified based on the comparison (block 510). For instance, the analytics module 212 may check for a variety of differences between the screen image and the reference image. Generally, the analytics module 212 determines the exactness between blocks and the corresponding images. The analytics module 212 may look at qualitative differences such as colors matching, text and graphics alignment, complete character matching and so forth. The one or more filters 128 applied to the screen image and the reference image may be configured to perform various tests, checks, and conversions to enable the analytics module 212 to indentify differences between the images.

Data is generated that is indicative of the identified differences (block 512). A variety of data to indicate and/or describes differences between images is contemplated. For example, based on identified differences, analytics module 212 may generate a number that describes how closely the two images match one another. The number may indicate how many differences are detected. In an implementation, the data may define the differences on a relative scale, such on a scale from 1 to 10, 1 to 100, and so forth. The data may also include descriptions of the identified differences. For example, if a line of the screen image is misaligned, data may be generated to specify the location and extent of the misaligned line. The data identifying the differences may be output via the image analysis tool 114 for communication to a developer. The developer may then use the data to make adjustments to the device driver 116 to account for the identified differences.

CONCLUSION

Although the block based image processing techniques have been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   identifying one or more filters to process an input image;
   obtaining attributes describing the one or more filters the attributes describing at least one of: an amount of buffer space used by the one or more filters, arrangement of valid and invalid data in blocks output from the one or more filters, or an overlap parameter to describe overlapping of data in the plurality of blocks for processing by the one or more filter;
   loading image data into a plurality of blocks according to the attributes;
   applying the one or more filters block by block to form processed blocks from the plurality of blocks; and
   stitching the processed blocks together according to the attributes to form a processed image.

2. A method as recited in claim 1, further comprising determining a block size for the plurality of blocks based upon a tunable memory parameter input by a user.

3. A method as recited in claim 1, wherein the loading includes overlapping image data in the plurality of blocks based upon the attributes.

4. A method as recited in claim 1, wherein the stitching includes discarding invalid image data in the processed blocks based upon the attributes.

5. A method as recited in claim 1, wherein the input image is generated by a device driver for output to a corresponding peripheral device.

6. A method as recited in claim 1, wherein the input image is generated by a printer driver for output to a corresponding printing device.

7. A method as recited in claim 1, wherein:
   the plurality of blocks are loaded to input surfaces defined in memory of a computing device; and
   the processed blocks are stored to output surfaces defined in the memory.

8. A method as recited in claim 1, wherein loading the image data into a plurality of blocks includes:
   loading the input image as successive scan lines; and
   loading image data from each of the successive scan lines into the plurality of blocks.

9. A method as recited in claim 8, wherein a size of the plurality of blocks is selected as between approximately 10 to 100 times smaller than a length of the scan lines.

10. A method as recited in claim 1, further comprising:
    performing the loading and applying on successive scan lines of the input image;
    determining that available memory is insufficient to load the scan lines as a whole; and
    dividing the scan lines into two or more portions to enable the loading and the applying.

11. A method as recited in claim 1, wherein the one or more filters are maintained in a filter database that relates the one or more filters to the attributes.

12. One or more computer-readable media excluding signals per se comprising instructions that are stored thereon and are executable on a computing device to:
    determine a block size for processing an input image;
    receive a selection of filters to apply to process the input image;
    obtain attributes describing the filters; and
    process the input image with the filters as a plurality of blocks of the determined size based upon the attributes to form a processed image including:
       determining when available memory is insufficient to load scan lines of the input image as a whole; and
       dividing the scan lines into two or more portions to enable loading of the input image into plurality of blocks.

13. One or more computer-readable media as recited in claim 12, wherein the block size is defined by a tunable memory parameter input by a user.

14. One or more computer-readable media as recited in claim 12, further comprising instructions to:
- load the input image into the plurality of blocks according to the attributes;
- apply the one or more filters to each of the plurality of blocks to form a plurality of processed blocks;
- stitch the plurality of processed blocks together according to the attributes to form the processed image.

15. One or more computer-readable media as recited in claim 12, further comprising instructions to:
- compare each of the plurality of blocks of the image to a corresponding block of a reference image;
- generate data indicative of differences between the image and the reference image based upon the comparison.

16. One or more computer-readable media as recited in claim 15, wherein the image is generated by a device driver for output to a corresponding peripheral device, and the comparison to the reference image is performed to verify image processing that is performed by the device driver.

17. A computing system comprising:
- one or more processing devices;
- a memory; and
- one or more modules stored in the memory and executable via the one or more processing devices to:
  - determine a block size for processing an input image generated by a device driver for output to a corresponding peripheral device;
  - receive a selection of filters to apply to process the input image;
  - obtain attributes describing the filters; and
  - process the input image with the filters as a plurality of blocks of the determined size based upon the to form a processed image; and
  - verify image processing that is performed by the device driver by comparing the processed image to a reference image.

18. A computing system as recited in claim 17, wherein the one or more modules are further executable via the one or more processing devices to:
- load the input image into the plurality of blocks according to the attributes;
- apply the one or more filters to each of the plurality of blocks to form a plurality of processed blocks;
- stitch of the plurality of processed blocks together according to the attributes to form the processed image.

19. A computing system as recited in claim 17, wherein the one or more modules are further executable via the one or more processing devices to:
- compare each of the plurality of blocks of the image to a corresponding block of a reference image;
- generate data indicative of differences between the image and the reference image based upon the comparison.

* * * * *

UNITED STATES PATENT AND TRADEMARK OFFICE
CERTIFICATE OF CORRECTION

PATENT NO. : 8,107,758 B2  
APPLICATION NO. : 12/104427  
DATED : January 31, 2012  
INVENTOR(S) : Aaron R. Lahman et al.

Page 1 of 1

It is certified that error appears in the above-identified patent and that said Letters Patent is hereby corrected as shown below:

In column 12, line 63, in Claim 12, after "into" insert -- the --.

In column 14, line 5, in Claim 17, after "the" insert -- attributes --.

Signed and Sealed this
Twenty-seventh Day of March, 2012

David J. Kappos
*Director of the United States Patent and Trademark Office*